United States Patent [19]
Morimoto et al.

[11] Patent Number: 6,022,131
[45] Date of Patent: Feb. 8, 2000

[54] ROOM LIGHTING UNIT FOR VEHICLES

[75] Inventors: Mitsuaki Morimoto; Atsuyoshi Yamaguchi, both of Shizuoka, Japan

[73] Assignee: Yazaki Corporation, Tokyo, Japan

[21] Appl. No.: 08/997,740

[22] Filed: Dec. 24, 1997

[30] Foreign Application Priority Data

Dec. 26, 1996 [JP] Japan .................................. 8-348707

[51] Int. Cl.$^7$ ................................................ B60Q 3/02
[52] U.S. Cl. .................... 362/549; 362/226; 362/490; 362/543; 315/84
[58] Field of Search ..................... 362/226, 479, 362/486, 488, 490, 496, 543, 548, 549; 315/84

[56] References Cited

U.S. PATENT DOCUMENTS

| | | | |
|---|---|---|---|
| 3,358,134 | 12/1967 | Gonyea | 362/543 |
| 4,628,417 | 12/1986 | Kaminski et al. | 362/490 |
| 4,819,134 | 4/1989 | Rossi | 362/488 |
| 5,077,643 | 12/1991 | Leach | 362/490 |
| 5,442,530 | 8/1995 | Viertel et al. | 315/84 |
| 5,521,806 | 5/1996 | Hutzel et al. | 362/486 |
| 5,546,288 | 8/1996 | Var Order et al. | 362/490 |

FOREIGN PATENT DOCUMENTS 4-65637  6/1992  Japan .

*Primary Examiner*—Alan Cariaso
*Attorney, Agent, or Firm*—Armstrong, Westerman, Hattori, McLeland & Naughton

[57] ABSTRACT

This invention provides a room lamp unit for vehicles comprising a main unit body fixed to an interior of a vehicle and a sub-unit detachably incorporated in the main unit body, said sub-unit including a room lamp and being electrically connected to said main unit body for supply of electric power for illumination. Thus constructed, any place inside and outside the vehicle can be illuminated by the sub-unit when detached from the main unit body.

11 Claims, 5 Drawing Sheets

ROOM LIGHTING UNIT FOR VEHICLES

FIELD OF THE INVENTION

This invention relates to a room lighting unit for illuminating an interior of a vehicle.

DESCRIPTION OF THE PRIOR ART

An example of a conventional room lighting unit as shown in FIG. 5 of the attached drawings is disclosed in Japanese Utility Model laid-open Publication No. 4-65637. In FIG. 5, reference numeral 30 represents a vehicle body, and 31 represents a molded ceiling fixed to the body from the inside of the vehicle. Numerals 32a and 32b represent lamps, and 33 represents a light conducting plate.

Light from the lamps 32a, 32b is transmitted to the light conducting plate 33 and emitted from each reflecting face of the light conducting plate which is formed to have multiple paraboloid reflecting faces, whereby the light reflected from each reflecting face illuminates the interior of the vehicle uniformly.

Although the interior of the vehicle can be illuminated uniformly with the above described room lighting unit, there has been such an inconveniece that another lighting unit must be prepared in order to find out something in a place out of the light from the room lighting unit such as underneath a passenger seat.

SUMMARY OF THE INVENTION

In view of the above drawback, it is an object of this invention to provide a room lighting unit which has a sub-unit detachable from the main unit body to illuminate anywhere in a compartment of a vehicle.

There is provided according to this invention, a room lighting unit for vehicles comprising a main unit body fixed to an interior of a vehicle and a sub-unit detachably incorporated in said main unit body, said sub-unit including a room lamp and being electrically connected to said main unit body for supply of electric power for illumination.

Threfore, the sub-unit can illuminate any desired place both inside and outside the vehicle when detached from the main unit body.

According to another feature of this invention, the sub unit contains a floating secondary battery. The electric connection between the sub-unit and the unit body is conducted by means of connecting terminals, whereby since the secondary battery is charged with power from the unit body to supply it to the room lamp, the sub-unit can be used both inside and outside the vehicle.

According to a still another feature, the electric connection between the sub-unit and the unit body is conducted by means of an electric wire, and therefore, the sub-unit can illuminate anywhere within the length of the wire, without requiring any maintenance of the secondary battery.

According to a further feature., an on-off switch for the room lamp is provided in the sub-unit in order to turn on the room lamp only in case of necessity, and so, the power comsumption of from the secondary battery can be saved.

According to a still further feature of this invention, when the on-off switch for the room lamp in the sub-unit is off, the room lamp can be turned on or off by means of a door switch of the vehicle. Therefore, the room lamp is turned on or off with opening or closing motion of a door at night and a driver can easily get into the vehicle even in the dark.

According to a yet further feature, the unit body is provided with map lamps for illuminating within reach. The map lamps are turned on and off by means of the door switch and can illuminate the inside of the vehicle even if the sub-unit is detached from the unit body. The turning on and off of these map lamps are performed by means of the door switch only when the sub-unit is detached from the unit body and so, the electric power consumption through lighting of the map lamps can be eliminated.

Further according to this invention, the connection between the unit body and the sub-unit can be performed by means of connecting members provided on the side walls of the unit body and the sub-unit mechanically as well as electrically, and thus the sub-unit can be easily assembled and electrically connected with the unit body.

DETAILED DESCRIPTION OF PREFERRED EMBODIMENTS

A preferred embodiment according to this invention will be explained referring to the accompanying drawings, FIGS. 1 and 2.

Figure 1:
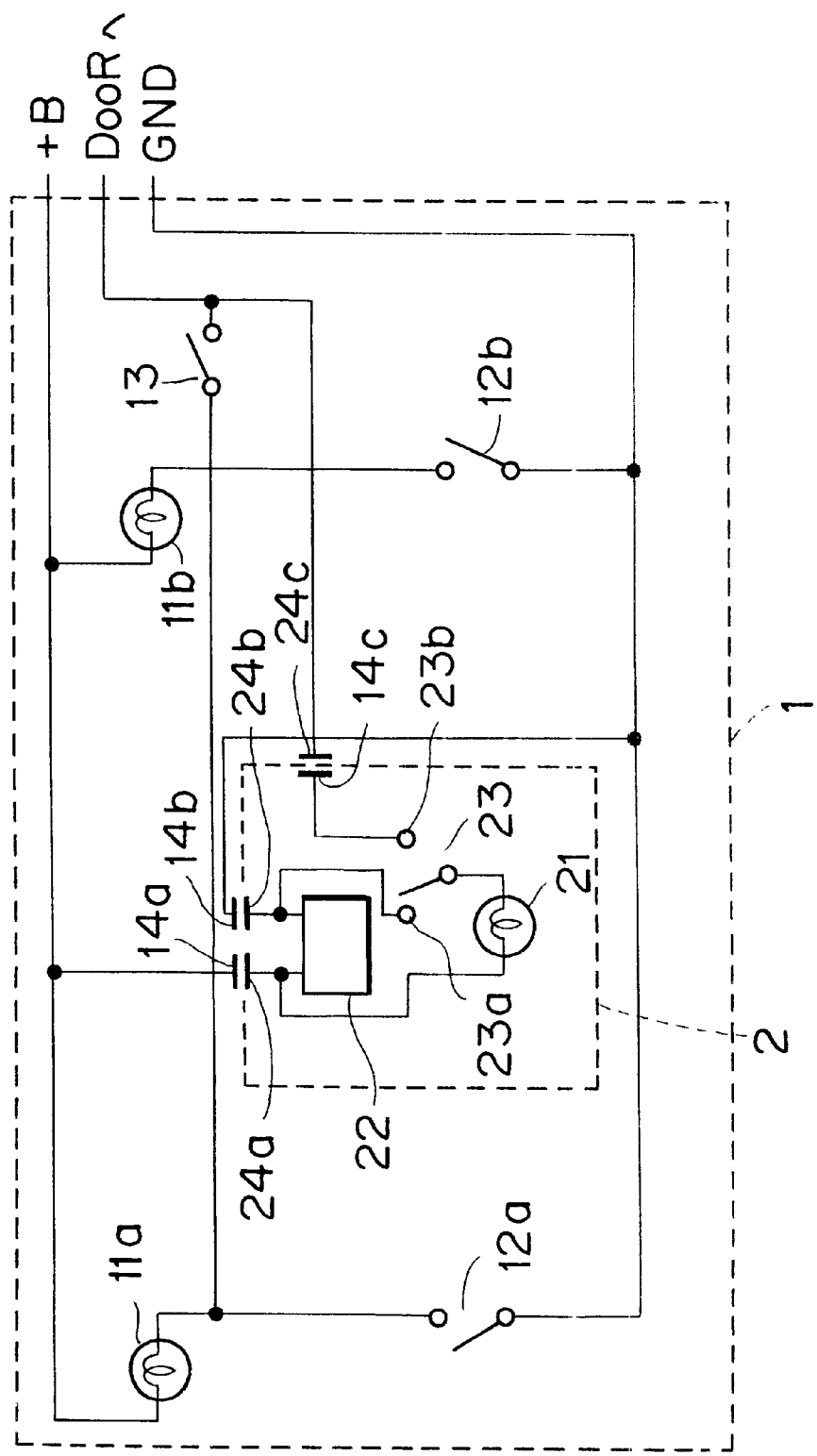
FIG. 1 is a circuit diagram of the room lighting unit according to this invention.
Figure 2:
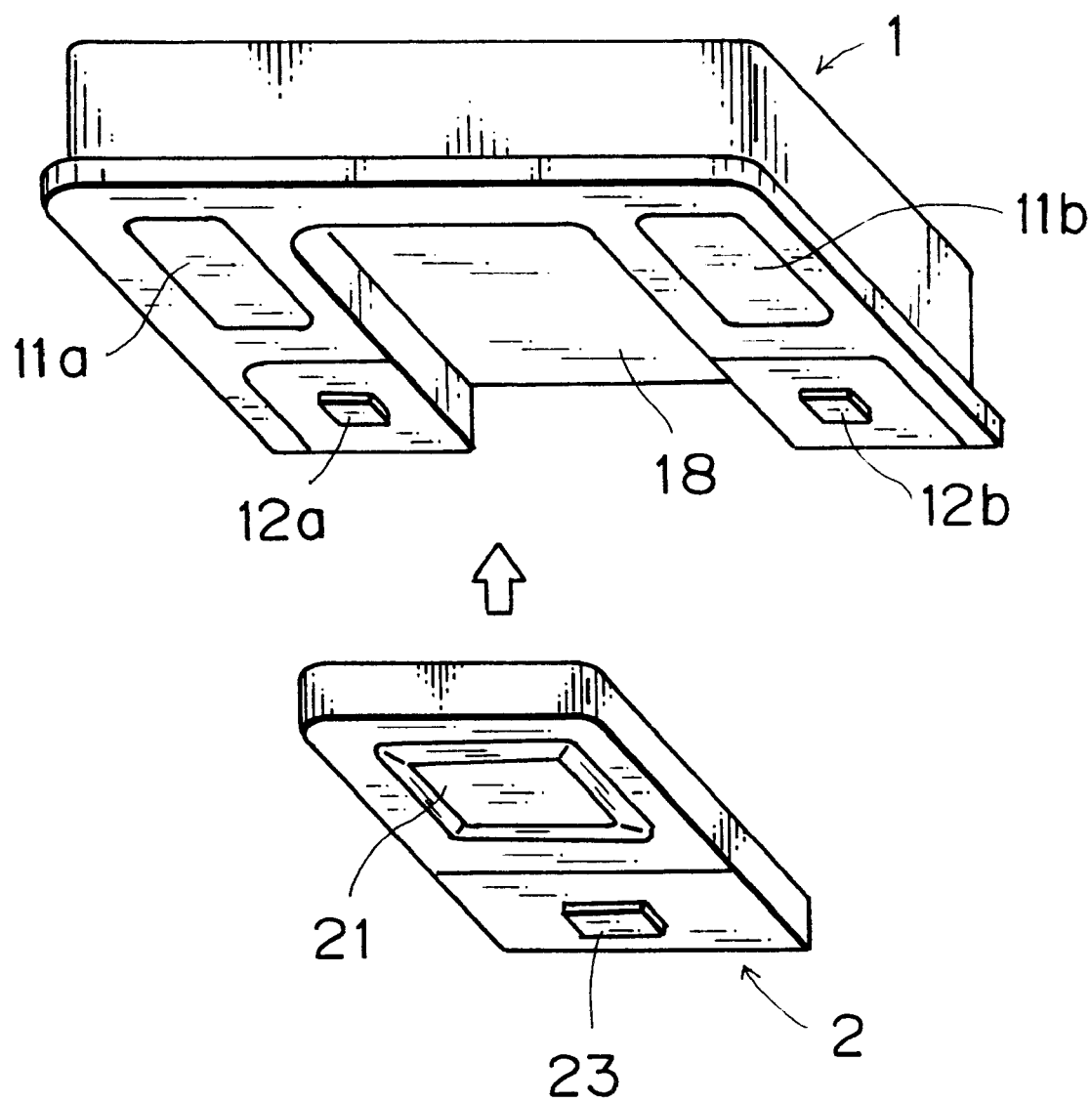
FIG. 2 is a perspective view of the room lighting unit of FIG. 1 in a detached state.

FIG. 1 is a circuit diagram of the room lighting unit of this invention and FIG. 2 is a perspective view of the room lighting unit in a detached state.

In FIG. 1 are shown a main unit body 1 fixed to the interior of the vehicle and a sub-unit 2 which is detachable from the main unit body 1 as hereinafter described referring to FIG. 2.

The sub-unit 2 consists of a room lamp 21, a secondary battery 22 which is charged by floating from a vehicle's battery (not shown), and a switch 23. Electric power is supplied to the secondary battery 22 through connecting terminals 24a, 24b. The switch 23 is connected to a door switch (not shown) through a connecting terminal 24c.

The unit body 1 is provided with map lamps 11a, 11b for lighting within reach, switches 12a, 12b for turning on and off of the map lamps 11a, 11b, and a switch 13 for selectively determining whether or not the on-off of the map lamps 11a, 11b is coupled operationally with the door switch.

The unit body 1 is provided with connecting terminals 14a, 14b and a connecting terminal 14c for interlocking the on-off of the room lamp 21 of the sub-nit 2 with the door switch.

The switch 13 is so constructed that it is in off-state when the sub-unit 2 is attached to the main unit body 1 and is in on-state when the sub-unit 2 is detached from the main unit body 1.

Usually, the sub-unit 2 is attached to the main unit body 1 to illuminate the interior of the vehicle. The power is supplied to the room lamp 21 to turn it on from the secondary battery 22 or through the connecting terminals 24a, 24b by switching the switch 23 to a side of the contact 23a. On the other hand, when the switch 23 is switched to the contact 23b, the room lamp 21 is connected to the door switch so as to be turned on when the door is open.

The map lamps 11a and 11b are turned on respectively when the switches 12a and 12b are respectively closed.

While the sub-unit 2 is detached from the unit body 1, the power is supplied from the secondary battery 22 by switching the switch 23 to the side of the contact 23a thereby to turn on the room lamp 21, enabling the sub-unit 2 to be moved to any desired place for necessary illumination. In the state where the sub-unit 2 is detached from the unit body 1, the switch 13 is closed to light the map lamps 11a, 11b when the vehicle's door is open, enabling them to act for the room lamp 21.

The switch 13 can be eliminated. However, by providing this switch 13, the map lamps 11a, 11b will not light in association with the door at the time when the sub-unit 2 is attached to the unit body 1, thus eliminating any consumption of the electric power.

Referring to FIG. 2, the unit body 1 is fixed to the vehicle's ceiling (not shown). In a concaved portion 18 formed in the lower face of the unit body 1 is detachably contained the sub-unit 2.

As described hereinabove, the unit body 1 has the map lamps 11a, 11b, and the switches 12a, 12b for turning on said map lamps. The sub-unit 2 has the room lamp 21 and the switch 23 for turning on the room lamp.

Figure 3A:
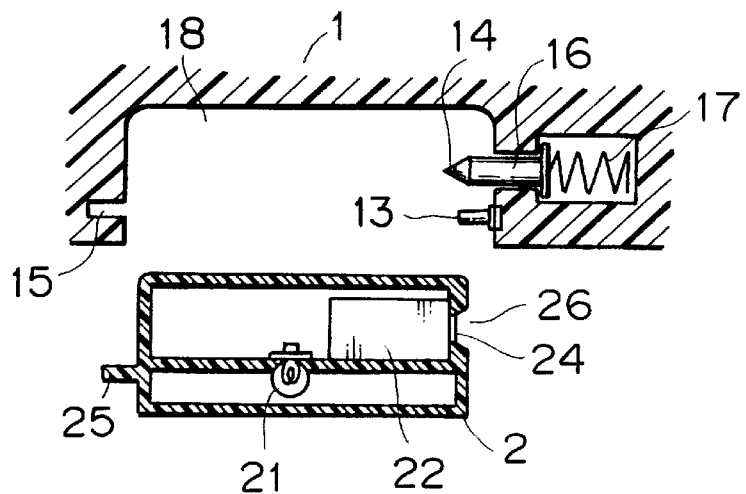
FIG. 3A shows a method of attaching the sub-unit to the unit body from the detached state.
Figure 3B:
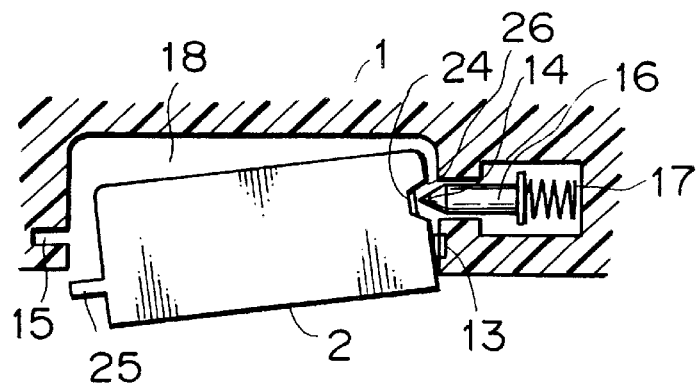
FIG. 3B shows the starting position of attaching the sub-unit to the unit body.
Figure 3C:
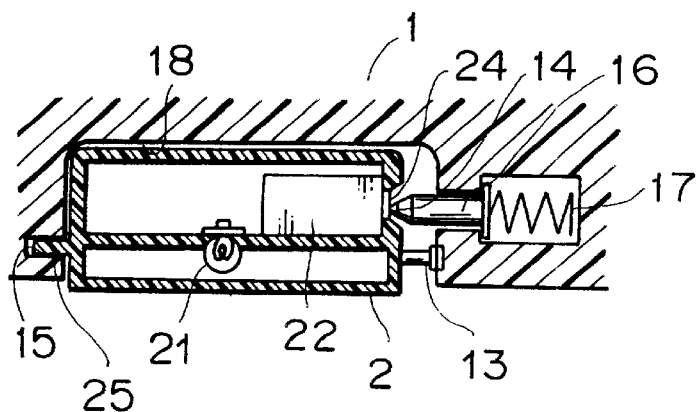
FIG. 3C shows the unit body and the sub-unit in assemmbled state.

Now referring to FIGS. 3A, 3B, 3C, there is illustrated a method of detachably receiving the sub-unit 2 in the concaved portion 18 of the main unit body 1.

The sub-unit 2 is formed with a projection 25 at its one side wall and a locking slot 26 at its other side wall. The main unit body 1 is formed with an engaging slot 15 on the wall of the concaved portion 18 for receiving said projection 25, and a locking member 16 for engaging with said locking slot 26. Said locking member 16 is energized toward the interior of the concaved portion 18 by means of a spring 17.

The locking member 16 incorporates therein a connecting wire for electrically connecting the main unit body with the sub-unit and carrying at its end the aforementioned connecting terminal 14. The connecting terminal 24 to be connected with said terminal 14 is provided at the bottom of the locking slot 26.

To the same side wall of the concaved portion 18 where the locking member 16 is provided is attached the aforementioned switch 13.

FIG. 3A shows the main unit body 1 and the sub-unit 2 in a detached state. For attaching the sub-unit 2 to the unit body 1, the locking slot 26 of the sub-unit 2 is fitted to the end of the locking member 16 of the unit body 1 as shown in FIG. 3B. Then the sub-unit 2 is pushed up by pressing the locking member 16 against the tension of the spring 17. Thus the projection 25 of the sub-unit 2 engages with the engaging slot 15 of the unit body 1 as shown in FIG. 3C.

During engagement between the projection 25 and the slot 15, the switch 13 is pressed on by the side wall of the sub-unit 2 to be turned off, while the connecting terminals 14 and 24 are pressed toward each other by means of the spring 17 to establish an electric connection.

Figure 4A:
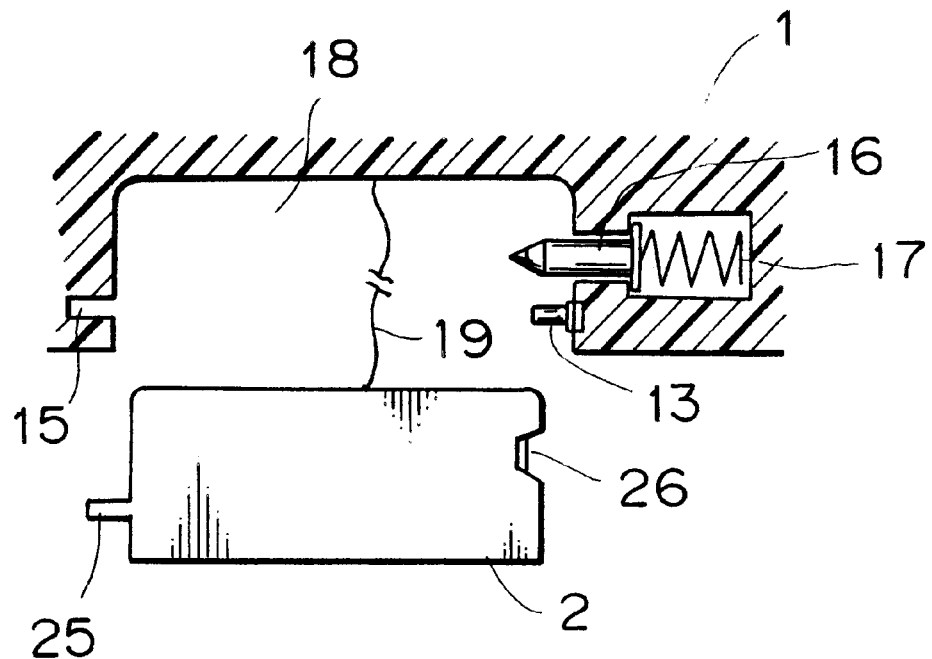
FIG. 4A shows another method of electric connection between the unit body and the sub-unit.
Figure 4B:
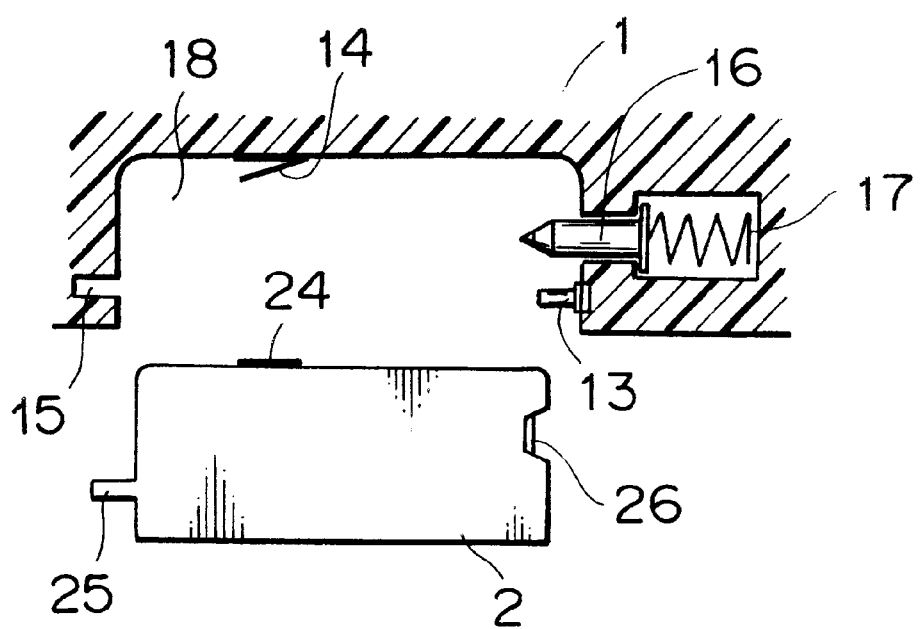
FIG. 4B shows a further method of electric connection between the unit body and the sub-unit.
Figure 5:
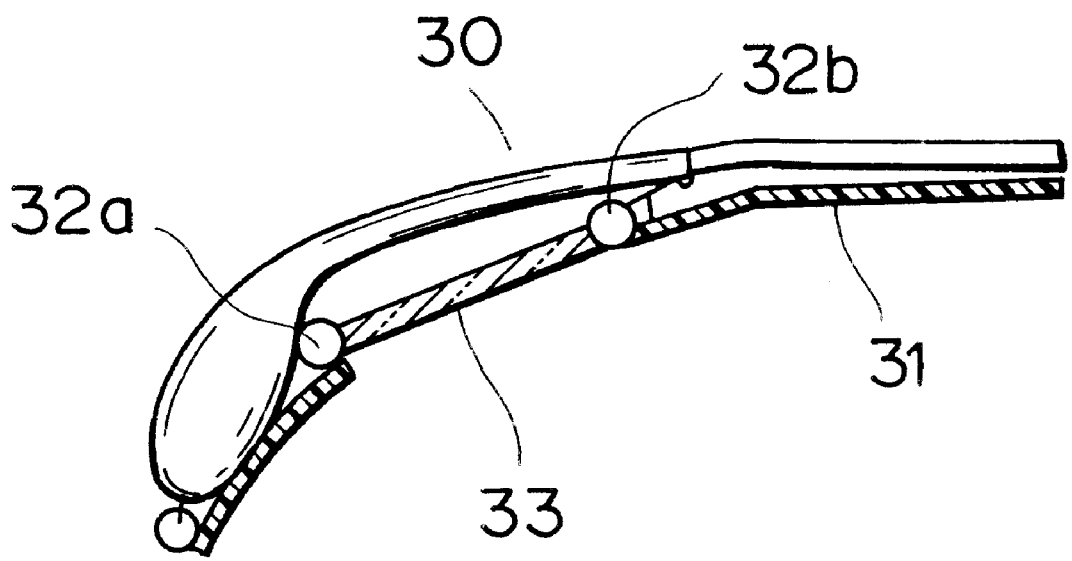
FIG. 5 is an explanatory view of the conventional room lighting unit.

FIGS. 4A, 4B show other embodiments of the elctric connection between the unit body 1 and the sub-unit 2.

In FIG. 4A, the unit body 1 and the sub-unit 2 are electrically connected with each other by means of an electric wire 19, thus eliminating necessity of providing the secondary battery 22 in the sub-unit 2. However in this case, the reach of the sub-unit 2 is limited to the length of the wire 19.

In the embodiment of FIG. 4B, the connecting terminal 14 is provided on the ceiling of the concaved portion 18 and the connecting terminal 24 is provided on the upper wall of the sub-unit 2 at the position facing with the terminal 14. It is preferable that the connecting terminal 14 has a spring action to press it against the connecting terminal 24.

As described hereinabove, the room lighting unit according to this invention consists of the main unit body fixed to the interior of the vehicle and the sub-unit containing the room lamp, which is detachable from the main unit body but electrically connected with the main unit body for power supply. Therefore, the sub-unit can illuminate desired places even if the sub-unit is detached from the main unit body.

The sub-unit contains the floating secondary battery. The electric connection between the sub-unit and the main unit body is performed by means of the connecting terminals whereby the secondary battery is floated with electric power supplied from the main unit body and then the electric power is supplied to the room lamp. Thus the sub-unit can be used both inside and outside the vehicle.

In another embodiment, the electric connection between the sub-unit and the main unit body is performed by means of an electric wire, and therefore, the sub-unit can illuminate anywhere within the reach of the wire.

The on-off switch for the room lamp is provided in the sub-unit in order to turn on the room lamp only in case of necessity, and so, the power consumption of the secondary battery can be saved.

When the on-off switch for the room lamp in the sub-unit is off, the room lamp can be turned on or off by means of the door switch of the vehicle. Therefore, the room lamp is turned on or off interlockingly with opening or closing action of the door at night and a driver can easily get into the vehicle even in the dark.

The unit body is provided with the map lamps for illuminating within reach. The map lamps are lit by means of the door switch and can illuminate the interior of the vehicle even if the sub-unit is detached from the unit body. The on-off of these map lamps are performed by means of the door switch only when the sub-unit is detached from the unit body and so, the electric power consumption in lighting of the map lamps can be eliminated.

Further, the connection between the unit body and the sub-unit can be performed by means of connecting members provided on the side walls of the unit body and the sub-unit mechanically as well as electrically, and thus the sub-unit can be easily assembled and electrically connected with the unit body.

What is claimed is:

1. A room lighting unit for vehicles comprising:
   a main unit body fixed to an interior of a vehicle and a sub-unit detachably incorporated in said main unit body,
   said main unit body including map lamps for lighting within reach, and
   said sub-unit including a room lamp and being electrically connected to said main unit body for supply of electric power for illumination.

2. A room lighting unit as claimed in claim 1, wherein said sub-unit includes a secondary battery charged by floating with electric power supplied from the unit body.

3. A room lighting unit as claimed in claim 1 or 2, wherein the electric connection between the unit body and the sub-unit is performed by means of connecting terminals.

4. A room lighting unit as claimed in claim 1, wherein the electric connection between the unit body and the sub-unit is performed by means of an electric wire.

5. A room lighting unit as claimed in claim 1, 2 or 4, wherein said sub-unit includes a switch for turning on and off the room lamp.

6. A room lighting unit as claimed in claim 5, wherein when said switch for the room lamp is off, the room lamp is connected to a door switch associated with a vehicle's door whereby the room lamp is turned on and off according to opening and closing motion of the door.

7. A room lighting unit as claimed in claim 1, 2 or 4, wherein said map lamps being adapted to be turned on and off by means of a door switch.

8. A room lighting unit as claimed in claim 7, wherein said map lamps are adapted to be turned on and off by means of a door switch only when said sub-unit is detached from the main unit body.

9. A room lighting unit as claimed in claim 1, 2 or 4, wherein said sub-unit includes a projection at its one side wall and a locking slot at its other side wall, while said main unit body has a concaved portion for containing the sub-unit, said concaved portion having an engaging slot at its one side wall confronting said projection and a spring-biased retractile locking member at its other side wall confronting said locking slot, whereby the sub-unit is incorporated in the main unit body and electrically connected thereto by means of said locking member.

10. A room lighting unit as claimed in claim 9, wherein said locking member incorporates therein a connecting wire carrying at its end one of connecting terminals which is connected with another connecting terminal provided in the bottom of said locking slot.

11. A room lighting unit as claimed in claims, wherein one of connecting terminals is provided on a ceiling of said concaved portion while another connecting terminal is provided on an upper wall of the sub-unit at a position facing with said one of the connecting terminals.

* * * * *